June 7, 1960  C. R. KENNY  2,940,048
SIGNAL CONVERSION SYSTEM
Filed July 31, 1957
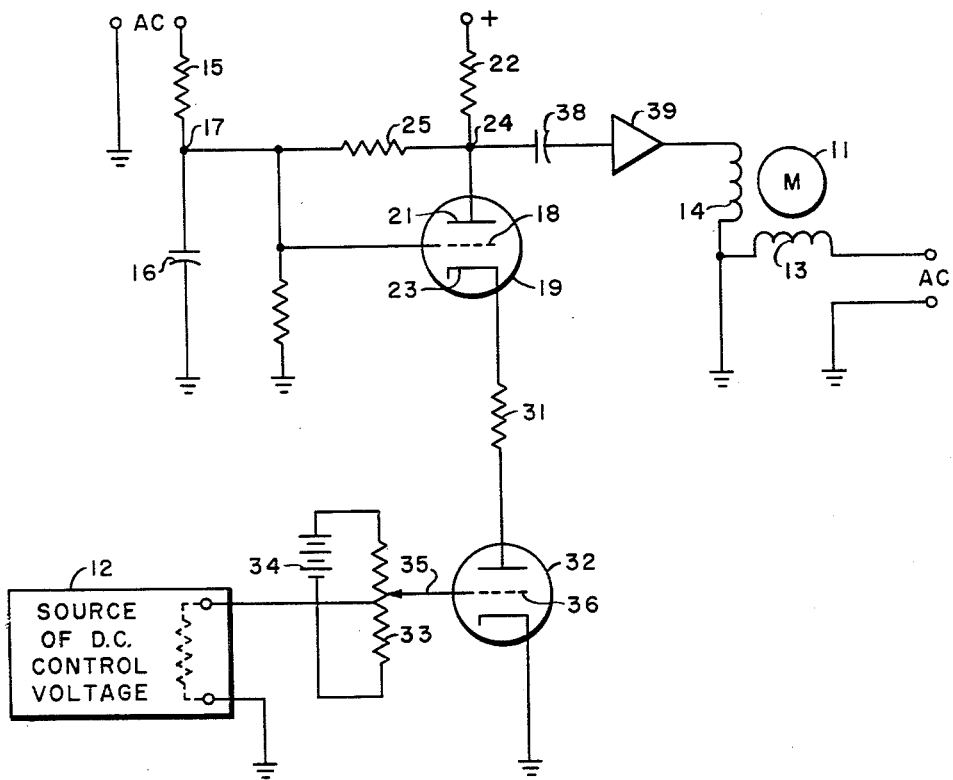
INVENTOR.
CHARLES R. KENNY
BY *H. L. Mackay*
ATTORNEY.

United States Patent Office 2,940,048
Patented June 7, 1960

2,940,048

SIGNAL CONVERSION SYSTEM

Charles R. Kenny, Purdy Station, N.Y., assignor to General Precision, Inc., a corporation of Delaware Filed July 31, 1957, Ser. No. 675,292

3 Claims. (Cl. 328—155)

This invention relates to apparatus for converting a direct current signal into an alternating current signal containing the same information.

Electronic control apparatus often employs both direct current and alternating current signals to convey intelligence and it is frequently desirable to convert a signal of one kind into a corresponding signal of the other kind. Various converters for this purpose have been devised in the past but have either been complex or non-linear or both.

It is an object of the invention to provide apparatus for deriving an alternating voltage the phase and magnitude of which are controlled by a direct voltage.

Another object is to provide apparatus for deriving an alternating voltage which is a linear function of a controlling direct voltage.

Another object is to provide simple apparatus without moving parts for generating an alternating current signal from a direct current signal.

Broadly, the invention contemplates adding two alternating voltages which are 180 degrees out of phase with each other and controlling the magnitude of one of them in accordance with the direct current control voltage. More specifically, a source of alternating current is connected to the input of a single stage amplifier and is also added algebraically to the output. Since the input and output are out of phase, the phase and magnitude of the resultant depends upon the gain of the amplifier, which is controlled by the direct current signal.

For a clearer understanding of the invention, reference may be made to the following detailed description and the accompanying drawing the single figure of which is a schematic diagram of a control system including the invention.

Referring now to the drawing, the invention is shown as a portion of a system for controlling a two phase motor 11 from a source 12 of direct current control voltage. With one winding 13 of the motor connected directly to the alternating current line as shown the other winding 14 must be supplied with a voltage which is either 90° or 270° out of phase with the line voltage, depending upon the desired direction of rotation. Both the magnitude and the phase of the voltage supplied to winding 14 are determined by the voltage from source 12.

The alternating current line is also connected across a phase shifting network comprising the series combination of a resistor 15 and a capacitor 16 of such relative values that the voltage of their junction 17 with respect to ground is substantially 90° out of phase with the line voltage. The junction 17 is connected to the grid 18 of a triode 19 having an anode 21 connected to a source of positive potential through a load resistor 22 and having a cathode 23 the circuit of which will be described subsequently. The potential of junction 24 connected to the anode 21 will therefore have a first component which, due to the amplification action of tube 19, is 180° out of phase with the potential of junction 17. The junction 24 is connected to the junction 17 through a resistor 25 so that the potential of junction 24 has a second component which is in phase with the potential of junction 17. The phase and magnitude of the resultant depends upon which component predominates and this is determined by the gain of the amplifier. There is a value of gain such that the two components cancel and the output is zero while a gain greater or less than this amount generates an output of one phase or the other and of a magnitude increasing with the departure of the gain from the reference value.

The cathode 23 is returned to ground through a resistor 31 and the anode-cathode circuit of a triode 32 with the aid of which the gain of tube 19 is controlled. The source 12 of control voltage has one terminal grounded and the other connected to the midpoint of a potentiometer 33 the extremities of which are connected across a source 34 of unidirectional potential such as a battery. The slider 35 is connected to the grid 36 of tube 32. By this arrangement a voltage of either polarity may be added to that from the source 12 in order to adjust the value of control voltage at which the output at junction 24 is zero. If, as is most likely, the source 12 includes a conductive path between terminals as indicated by the dashed outline of a resistor, no additional resistor between grid 36 and ground is required.

The circuit operates in a manner similar to that of the familiar cascode circuit. Variation of the potential of grid 36 varies the conductivity of tube 32 and thereby varies the magnitude of the cathode resistor of tube 19. Since the signal to tube 19 is applied between grid and ground, variation of the cathode resistor varies the degenerative feedback and the gain of tube 19. A few volts variation in the potential of grid 36 is sufficient to change the output at junction 24 from a few volts of one phase through zero to a few volts of the opposite phase. The output is passed through a capacitor 38 to an amplifier 39 the output of which energizes the winding 14.

A working model was constructed with the following parameters:

Tube 19_____ ½ 12AT7.
Tube 32_____ 6AU6 triode connected.
Resistor 15_____ 10,000 ohms.
Resistor 22_____ 68,000 ohms.
Resistor 25_____ 68,000 ohms.
Resistor 31_____ 10,000 ohms.
Capacitor 16_____ 0.2 mf.
Anode voltage_____ 150 v. D.C.
A.C. line_____ 115 v. 400 c.p.s.

It was found that with —0.5 volt on the grid 36, the voltage of junction 24 was 2.05 volts R.M.S., lagging with respect to the line. With —2.5 volts on grid 36, the A.C. voltage at junction 24 was 1.60 volts R.M.S., leading with respect to the line. Intermediate values of bias showed that the relationship between bias and output voltage was substantially a linear function between the two values above mentioned, with zero output occurring for a bias of —1.6 volts.

It is thus apparent that the present invention requires only simple apparatus to derive an alternating voltage of reversible phase the magnitude of which is a linear function of a direct current signal. Although a specific embodiment has been described many modifications may be made within the scope of the invention by those skilled in the art. It is therefore desired that the invention be limited only by the true scope of the appended claims.

What is claimed is:

1. Apparatus for deriving an alternating voltage of controllable magnitude which is either in phase with or in phase opposition to a reference alternating voltage, comprising, an electron tube including a cathode, an anode and a control electrode, a source of reference alternating voltage having a first terminal connected to said control electrode and a second terminal connected to ground, a first impedance connected between said cathode and ground, a second impedance connected between said anode and a source of positive potential, a third impedance connected between said first terminal of said source and said anode, whereby the alternating potential of said anode is the algebraic sum of a first component transmitted through said third impedance from said source and a second component one hundred and eighty degrees out of phase with said first component due to the amplification action of said tube, and whereby there is a median magnitude of said first impedance for which the magnitudes of said first and second components are equal, resulting in zero alternating potential on said anode, and means for varying the magnitude of said first impedance throughout a range extending above and below said median magnitude, whereby magnitudes above said median value result in an alternating potential on said anode which is in phase with said reference voltage while magnitudes below said median value result in an alternating potential on said anode which is in phase opposition to said reference voltage.

2. Apparatus for deriving an alternating voltage of controllable magnitude which is either in phase with or in phase opposition to a reference alternating voltage according to whether a unidirectional signal voltage varies below or above a reference value comprising, an electron tube including a cathode, an anode and a control electrode, a source of reference alternating voltage having a first terminal connected to said control electrode and a second terminal connected to ground, a first impedance connected between said cathode and ground, a second impedance connected between said anode and a source of positive potential, a third impedance connected between said first terminal of said source and said anode, whereby the alternating potential of said anode is the algebraic sum of a first component transmitted through said third impedance from said source and a second component one hundred and eighty degrees out of phase with said first component due to the amplification action of said tube and whereby there is a median magnitude of said first impedance for which the magnitude of said first and second components are equal resulting in zero alternating potential on said anode, and means for varying the magnitude of said first impedance above and below said median magnitude in response to deviations of said signal voltage from said reference value whereby deviations below said reference value result in an alternating potential on said anode which is in phase with said reference voltage while deviations above said reference value result in an alternating potential on said anode which is in phase opposition to said reference voltage.

3. Apparatus for deriving an alternating voltage of controllable magnitude which is either in phase with or in phase opposition to a reference alternating voltage according to whether a unidirectional signal voltage varies below or above a reference value comprising, a first electron tube including a cathode, an anode and a control electrode, a source of reference alternating voltage having a first terminal connected to said control electrode and a second terminal connected to ground, a second electron tube including a cathode, an anode and a control electrode, a conductive path connecting said cathode of said first tube to said anode of said second tube, a conductive path connecting said cathode of said second tube to ground, whereby the anode-cathode circuit of said second tube constitutes a portion of the cathode-ground resistance of said first tube, a first resistor connected between said anode of said first tube and a source of positive potential, a second resistor connected between said first terminal of said source and said anode of said first tube, whereby the alternating potential of said anode of said first tube is the algebraic sum of a first component transmitted through said second resistor from said source and a second component one hundred and eighty degrees out of phase with said first component due to the amplification action of said first tube and whereby there is a median magnitude of the cathode-ground resistance of said first tube for which the magnitude of said first and second components are equal resulting in zero alternating potential on said anode of said first tube, means for varying the control electrode-cathode potential of said second tube in response to said unidirectional signal voltage, and means for adjusting the static control electrode-cathode potential of said second tube to make the cathode-ground resistance of said first tube equal to said median value when said signal voltage has said reference value, whereby variations of said signal voltage above and below said reference value result in an alternating potential on said anode of said first tube which is respectively in phase opposition to and in phase with said reference alternating voltage.

References Cited in the file of this patent

UNITED STATES PATENTS

| | | |
|---|---|---|
| 2,078,762 | Holst | Apr. 27, 1937 |
| 2,226,459 | Bingley | Dec. 24, 1940 |
| 2,247,316 | Smith | June 24, 1941 |
| 2,450,818 | Vermillion | Oct. 5, 1948 |
| 2,531,474 | Saxton | Nov. 28, 1950 |
| 2,544,340 | Maxwell | Mar. 6, 1951 |